(12) United States Patent
Sung

(10) Patent No.: US 6,278,504 B1
(45) Date of Patent: *Aug. 21, 2001

(54) THIN FILM TRANSISTOR FOR LIQUID CRYSTAL DISPLAY DEVICE HAVING A SEMICONDUCTOR LAYER'S WIDTH SMALLER THAN A WIDTH OF THE GATE, DRAIN AND SOURCE ELECTRODES

(75) Inventor: Chae Gee Sung, Miyagi-ken (JP)

(73) Assignee: LG. Philips LCD Co., Ltd., Seoul (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/787,463

(22) Filed: Jan. 22, 1997

(30) Foreign Application Priority Data

Jan. 25, 1996 (JP) ...................................... 8-011237

(51) Int. Cl.$^7$ ...................................... G02F 1/136

(52) U.S. Cl. .................................. 349/46; 349/42; 349/43

(58) Field of Search .......................... 349/42–46; 437/21; 257/59, 61

(56) References Cited

U.S. PATENT DOCUMENTS

| | | | |
|---|---|---|---|
| 5,187,551 | * | 2/1993 | Shoji et al. ........................... 257/347 |
| 5,286,659 | * | 2/1994 | Mitani et al. ......................... 437/21 |
| 5,471,330 | * | 11/1995 | Sarma ................................... 359/59 |
| 5,473,168 | * | 12/1995 | Kawai et al. ......................... 257/61 |
| 5,474,941 | * | 12/1995 | Mitani et al. ......................... 437/21 |
| 5,614,731 | * | 3/1997 | Uchikoga et al. ..................... 257/59 |
| 5,712,494 | * | 1/1998 | Akiyama et al. ..................... 257/59 |
| 5,929,958 | * | 7/1999 | Ohta et al. ........................... 349/141 |

FOREIGN PATENT DOCUMENTS 05-293823   11/1993   (JP) .

* cited by examiner

Primary Examiner—William L. Sikes
Assistant Examiner—Julie Ngo
(74) Attorney, Agent, or Firm—Brinks Hofer Gilson & Lione

(57) ABSTRACT

A thin film transistor for liquid crystal display device including a gate electrode 42 formed on a transparent substrate 41, an insulation layer 43 formed to cover the upper surface of the transparent substrate and the gate electrode, a semiconductor layer 46 formed on the insulating layer in confrontation with the gate electrode, an etching stopper layer 44 formed on the semiconductor layer and a source electrode 49 and a drain electrode 50 disposed adjacent to each other in confrontation on both the sides of the semiconductor layer over the etching stopper layer, the semiconductor layer and the insulation layer is arranged such that the gate electrode is formed to such a size as to conceal the semiconductor layer from the transparent substrate side and the line width of the source electrode and the drain electrode is made larger than the width of the semiconductor layer along the same direction as the line width. With this arrangement, there can be provided a thin film transistor for liquid crystal display device capable of suppressing the leak current of the semiconductor layer and lowering the off-current of the thin film transistor and a liquid crystal display device including the thin film transistor.

14 Claims, 4 Drawing Sheets

THIN FILM TRANSISTOR FOR LIQUID CRYSTAL DISPLAY DEVICE HAVING A SEMICONDUCTOR LAYER'S WIDTH SMALLER THAN A WIDTH OF THE GATE, DRAIN AND SOURCE ELECTRODES

BACKGROUND OF THE INVENTION

1. Field of the Invention

The present invention relates to a thin film transistor for liquid crystal display device having a structure for suppressing the deterioration of characteristics caused by a light such as a back light and the like and a liquid crystal display device provided with the thin film transistor.

2. Description of the Related Art

FIG. 5 shows an example of constitution of an equivalent circuit of an active matrix liquid crystal display device using a thin film transistor as a switch element.

In FIG. 5, a circuit is arranged such that a multiplicity of scan electrode wires $G_1, G_2, \ldots, G_n$ and a multiplicity of signal electrode wires $S_1, S_2, \ldots, S_m$ are wired in a matrix state and each of the scan electrode wires G is connected to a scan circuit 1 and each of the signal electrode wires S is connected to a signal supply circuit 2, respectively, thin film transistors (switch elements) 3 are disposed to the vicinities of the portions where the respective wires intersect and a capacitance unit 4 serving as a capacitor and a liquid crystal element 5 are connected to the drain of each of the thin film transistors 3.

In the circuit shown in FIG. 5, the scan electrode wires $G_1, G_2, \ldots, G_n$ are sequentially scanned to thereby turn of all the thin film transistors 3 on one scan electrode wire at the same time and a signal charge is accumulated from the signal supply circuit 2 to the capacitance units 4 which correspond to liquid crystal elements 5 to be displayed among the capacitance units 4 connected to the turned-on thin film transistors 3 through the signal electrode wires $S_1, S_2, \ldots, S_m$ in synchronism with the above scan. Since the thus accumulated signal charge continuously excites the corresponding liquid crystal elements 5 until the next scan is carried out even if the thin film transistors 3 are turned off, the liquid crystal elements 5 are controlled by a control signal and displayed. That is, the above drive permits the respective liquid crystal elements 5 to be driven statically even if they driven by external drive circuits 1, 2 on time sharing basis.

FIG. 6 and FIG. 7 show an example of structure in which the portions such as the scan electrode wires G, the signal electrode wires and the like are actually disposed on a substrate in the conventional active matrix liquid crystal display device shown by the equivalent circuit in FIG. 5.

In the active matrix display device shown in FIG. 6 and FIG. 7, the scan electrode wires G and the signal electrode wires S are wired on a transparent substrate 6 such as a glass or the like in a matrix state through insulation layers 9 disposed to the portions where the scan electrode wires G intersect the signal electrode wires S each other. Further, the thin film transistors are 3 disposed to the vicinities of the portions where the scan electrode wires G intersect the signal electrode wires S.

Since the thin film transistor 3 shown in FIG. 6 and FIG. 7 has a most ordinary arrangement, it includes the insulation layer 9 disposed on a gate electrode 8 provided by being drawn from the scan electrode wire G, a semiconductor layer 10 composed of amorphous silicon (a-Si), polysilicon or the like and disposed on the insulation layer 9, an etching stopper layer 7 disposed on the semiconductor layer 10, and further a drain electrode 11 and a source electrode 12 each composed of a conductor such as aluminum or the like and disposed so as to confront each other. Note, the semiconductor layer 10 is arranged as a channel portion where a carrier moves and the thin film transistor 3 shown in FIG. 7 is formed to a structure generally called an etch stopper type.

The drain electrode 11 is connected to a pixel electrode 15 formed on the substrate 6 through a contact hole 13 drilled to the insulation layer 9 as well as the source electrode 12 is connected to the signal electrode wire S. Ohmic contact layers 11a, 12a are formed under the drain electrode 11 and the source electrode 12 on the semiconductor layer 10 side thereof to establish an electric contact with the semiconductor layer 10 serving as the channel portion.

The active matrix liquid crystal display device is arranged such that a passivation layer 16 is disposed on the insulation layer 9, the drain electrode 11, the source electrode 12 and the like so as to cover them, an oriented film 17 is formed on the passivation layer 16, a transparent confronting substrate 19 including an oriented film 18 is disposed above the oriented film 17 shown in FIG. 7 and further a liquid crystal 20 is sealed between the oriented films 17, 18. Therefore, the pixel electrode 15 can control the orientation of the molecules of the liquid crystal by applying an electric field thereto. Note, numeral 22 in FIG. 7 denotes a black mask disposed to the confronting substrate 19 on the bottom surface side thereof so that it covers and conceals the portion other than the region where the pixel electrode 15 controls the orientation of the liquid crystal.

The liquid crystal display device having the above structure is usually arranged such that a polarization plate and a back light are disposed on the back side of the transparent substrate 6 as well as a polarization plate is also disposed on the back side of the confronting substrate 19 to permit a user to recognize a bright state and a dark state depending upon whether the orientation controlled liquid crystal 20 obstructs or pass the polarized state of a light emitted from the back light. However, when, for example, a light incident on the transparent substrate 6 from an oblique direction reaches the semiconductor layer 10 between the drain electrode 11 and the source electrode 12 as shown by the arrow $L_1$ of FIG. 7, a charge is made to the semiconductor layer 10 by being excited by the light and a photoelectric current flows. This phenomenon means that a leak current flows when the thin film transistor is driven regardless of that the circuit is turned off. Since the flow of the leak current increases an off-current when the liquid crystal is driven, there is a possibility that the light permeable characteristics of the liquid crystal are adversely affected by it.

Further, when a portion of a light incident on the transparent substrate 6 from an oblique direction is reflected by the black mask 22 and reaches the semiconductor layer 10 as shown by the arrow $L_2$ in FIG. 7, a charged is made to the semiconductor layer 10 by being excited by the light and a photoelectric current flows, thus there is a possibility that the light permeable characteristics of the liquid crystal are adversely affected by it likewise the above.

To solve the above problem, there is conventionally proposed a structure in which a source electrode 31 and a drain electrode 32 are disposed on a gate electrode 30 in confrontation with each other, the structure being arranged such that the gate electrode 30 is formed wider than a conventional one, both an etching stopper layer 33 and a semiconductor layer disposed thereunder are formed to a fallen-H shape and the etching stopper layer 33 is formed to such a width as to permit both the ends of the source electrode 31 and the drain electrode 32 to reach the half portions of the projections 33a of the etching stopper layer 33, as a plan structure is shown in FIG. 8A.

According to the structure of the example, since it is found that when the above photoelectric light flows, it flows through the side portion of the semiconductor layer located under the fallen-H-shaped projections 33a of the etching stopper layer 33, the photoelectric current is suppressed by increasing the length of the conductor bus of the photoelectric current at the side portion in the structure of the example.

Further, as shown in FIG. 8B, there is proposed a structure in which a source electrode 36 and an L-shaped drain electrode 37 are disposed on a gate electrode 35 in confrontation with each other, the structure being arranged such that both an etching stopper layer 38 and a semiconductor film thereunder are formed to an inverted-C-shape and the etching stopper layer 38 is formed to such a width as to permit both the ends of the source electrode 36 and the drain electrode 37 to reach the half portions of the projections 38a of the etching stopper layer 38. A photoelectric current is suppressed by increasing the length of the conductor bus of the photoelectric current at the side portion of the semiconductor layer also in the structure of this example.

In the structures shown in FIGS. 8A and 8B, however, since the increase of the length of the conductor bus of the photoelectric current in the semiconductor layer means that the area of the portion to be covered and concealed by the black mask 22, that is, the area of the portion including the gate electrode, the etching stopper layer, the semiconductor layer, the drain electrode and the source electrode which is different from the region where the orientation of the liquid crystal is controlled is increased, there arises a problem that an numerical aperture is lowered as a liquid crystal display device and a bright display is difficult to be obtained.

An object of the present invention made taking the above circumstances into consideration is to provide a thin film transistor for liquid crystal display device arranged such that a light is difficult to be incident on the portion of a semiconductor layer from a back light and the like so as to suppress a leak current in the semiconductor layer to thereby lower the off-current of the thin film transistor and even if the light is incident on the semiconductor layer, the leak current is made difficult to flow to thereby lower the off-current and a liquid crystal display device including the thin film transistor.

SUMMARY OF THE INVENTION

To solve the above problem, the present invention provides a thin film transistor for liquid crystal display device which includes a gate electrode formed on a transparent substrate, an insulation layer formed to cover the upper surface of the transparent substrate and the gate electrode, a semiconductor layer formed on the insulating layer in confrontation with the gate electrode, an etching stopper layer formed on the semiconductor layer and a source electrode and a drain electrode disposed adjacent to each other in confrontation on both the sides of the semiconductor layer over the etching stopper layer. In the thin film transistor, the semiconductor layer and the insulation layer are arranged such that the gate electrode is formed to such a size as to conceal the semiconductor layer from the transparent substrate side and the line width of the source electrode and the drain electrode is made larger than the width of the semiconductor layer along the same direction as the line width.

According to the present invention, the gate electrode can securely shield a light which tends to be incident on the semiconductor layer through the substrate, so that the occurrence of a photoelectric current in the semiconductor layer caused by the light incident from the substrate side can be prevented. Further, since the semiconductor layer does not partially project to the sides of the source electrode and the drain electrode, even if an light is incident on the semiconductor layer from the etching stopper layer side, no photoelectric current flows to the side portion of the semiconductor layer. Therefore, no unnecessary photoelectric current is caused to the semiconductor layer and the off-current of the thin film transistor is made lower than that of a conventional structure, thus a ratio of on-current and off-current, that is, an on/off ratio is enhanced.

Next, since the semiconductor layer need not be formed to an H-shape or a fallen-C-shape in the present invention, the size of the semiconductor layer need not be made larger than necessary. Therefore, since the region where the orientation of a liquid crystal is not controlled need not be made larger than necessary, an numerical aperture is not lowered as a liquid crystal display device.

According to the present invention, to solve the above problem, ohmic contact layers are formed to the source electrode and the drain electrode on the semiconductor layer sides thereof to make an electric contact with the semiconductor layer.

With this arrangement, the ohmic contact of the source and drain electrodes with the semiconductor layer can be secured.

Further, according to the present invention, there is provided a liquid crystal display device which comprises a thin film transistor array substrate including the above thin film transistor, a confronting substrate disposed to confront the thin film transistor array substrate, a liquid crystal sealed between the confronting substrate and the thin film transistor array substrate, a black mask disposed to a portion of the confronting substrate on the thin film transistor array substrate side thereof and a back light for causing a light to be incident on the confronting substrate side through the transparent substrate.

With the liquid crystal display device arranged as described above, an off-current can be lowered when the thin film transistor is driven, a liquid crystal display device having a high on/off ratio can be provided as well as a liquid crystal display device having a high numerical aperture and a bright display can be obtained. In addition, no light from the back light is incident on the semiconductor layer from the substrate side as well as even if a reflected light is incident on the semiconductor layer through the black mask, since a photoelectric current is difficult to flow in the semiconductor layer, there can be obtained a liquid crystal display device by which an on/off ratio is enhanced as compared with that of the conventional structure.

DESCRIPTION OF THE PREFERRED EMBODIMENT

An embodiment of the present invention will be described below with reference to the drawings.

Figure 1:
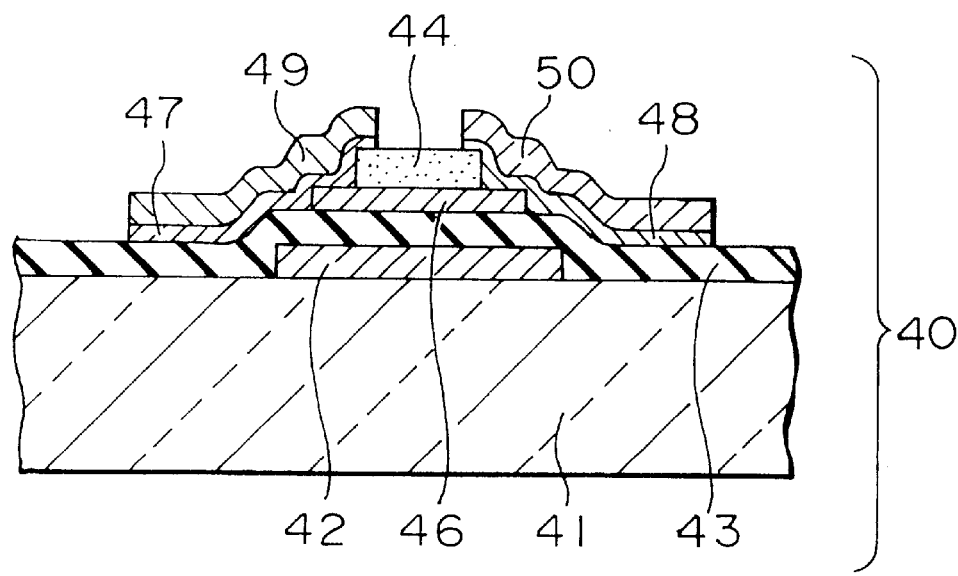
FIG. 1 is a cross sectional view showing a first embodiment of a thin film transistor array substrate including a thin film transistor according to the present invention.
Figure 2:
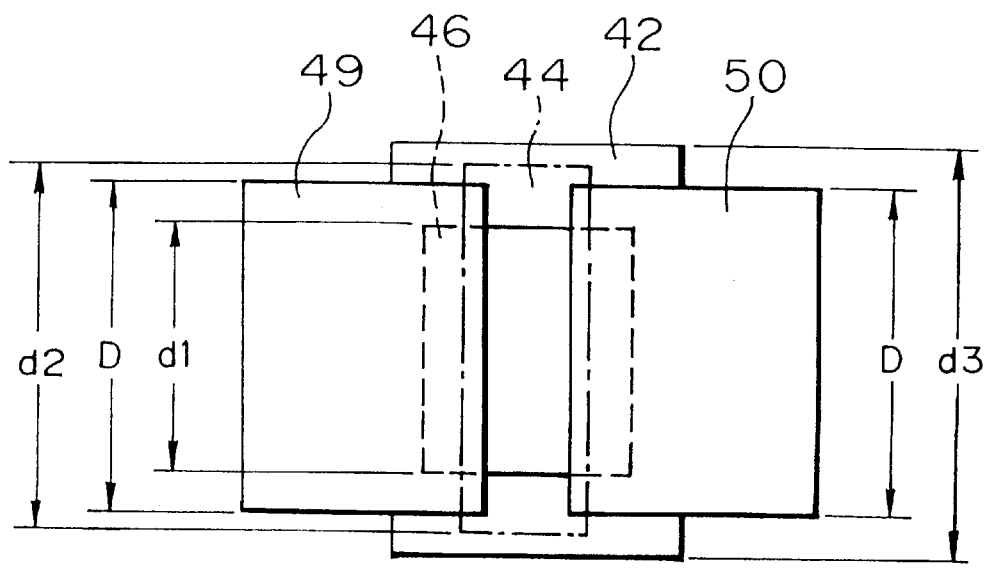
FIG. 2 is a schematic plan view of the substrate shown in FIG. 1.

FIG. 1 shows a first embodiment of a thin film transistor according to the present invention. A thin film transistor 40 of the embodiment is arranged such that a rectangular gate electrode 42 is formed on a transparent substrate 41 such as a glass (for example, #7059 glass having a refractive index of 1.530 made by Corning Inc.) etc. and an insulation layer 43 (for example, a silicon nitride film exhibiting a refractive index of about 1.85) is formed to cover the upper surface of the substrate 41 and the gate electrode 42. The gate electrode 42 is formed of a light shielding conductor metal material such as Al, Cr or the like. Further, a semiconductor layer 46 composed of amorphous silicon or the like and having a width slightly smaller than that of the gate electrode 42 shown in FIG. 1 is formed on the upper surface of the insulation layer 43 on the gate electrode 42, an etching stopper layer 44 is formed on the semiconductor layer 46, ohmic contact layers 47, 48 which are separated on the right and left sides in confrontation with each other are formed above the gate electrode 42, and a source electrode 49 is formed on the ohmic contact layer 47 and a drain electrode 50 is formed on the ohmic contact layer 48, respectively. In the above arrangement, the gate electrode 42 is made larger than the rectangular semiconductor layer 46 in both longitudinal and lateral widths as shown in FIG. 2 and formed to a size capable of covering and concealing the semiconductor layer 46 from the substrate 41 side as well as the line width of the source electrode 49 and the drain electrode 50 (the width denoted by a symbol D in FIG. 2, that is, the width in the direction perpendicular to the direction in which a current flows) is made larger than the width $d_1$ of the semiconductor layer 46 along the same direction. Thus, in other words, the width $d_1$ of the semiconductor layer 46 is formed smaller than the line width D of the source electrode 49 and the drain electrode 50 and the semiconductor layer 46 is formed in such a manner that both the ends of the source electrode 49 and the drain electrode 50 along the line width direction thereof are not connected to each other but the central potions of the source electrode 49 and the drain electrode 50 along the line width direction thereof are connected to each other. Further, in FIG. 2, the width $d_2$ of the etching stopper layer 44 along the same direction as the above line width direction is made larger than the line width of the source electrode 49 and the drain electrode 50 and smaller than the width $d_3$ of the gate electrode 42 along the same direction.

Figure 5:
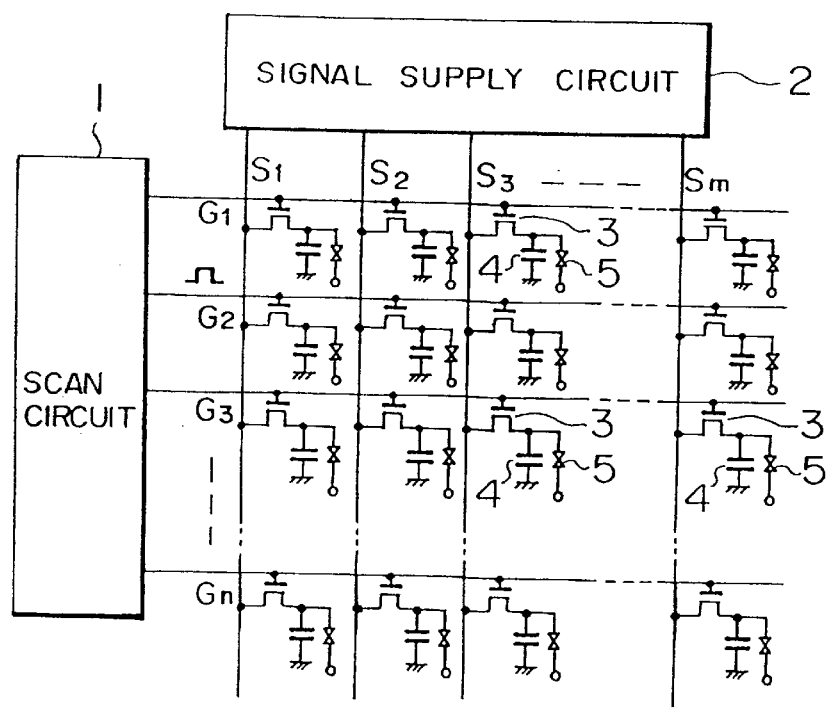
FIG. 5 is a circuit diagram showing an example an equivalent circuit of a conventional active matrix liquid crystal display device.
Figure 6:
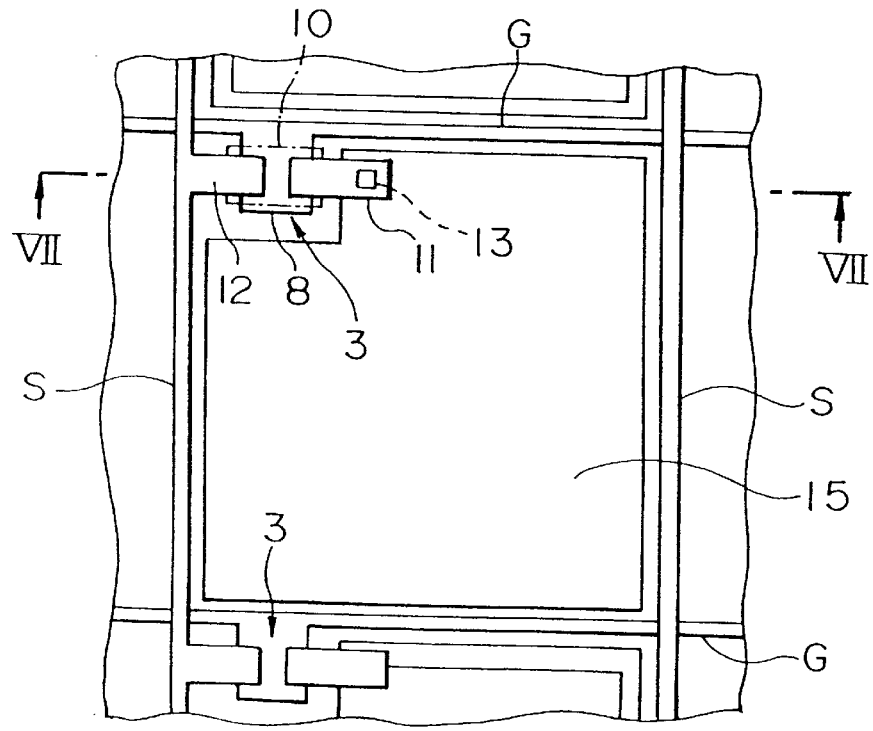
FIG. 6 is a plan view showing a portion of an example of a liquid crystal display device including the circuit shown in FIG. 5.
Figure 7:
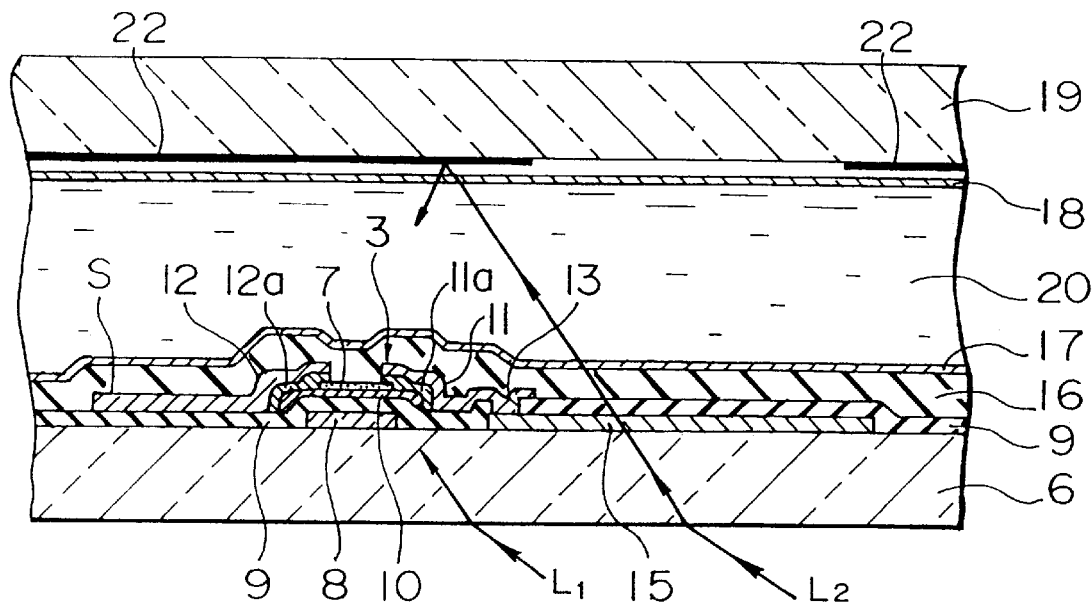
FIG. 7 is a cross sectional view taken along the line VII—VII of FIG. 6.

Note, although omitted in FIG. 1, the thin film transistor 40 having the structure of the embodiment is provided by being assembled to a liquid crystal display device in place of the thin film transistor array substrate of the liquid crystal display device shown in FIG. 5–FIG. 7 and used to drive a liquid crystal likewise the conventional thin film transistor. As the arrangement of it is schematically shown in FIG. 3, a black mask 53 is disposed to a confronting substrate 52 which is disposed in confrontation with the substrate 41 on the on the substrate 41 side thereof, so that it shields the region corresponding to the portion such as the gate electrode 42, the semiconductor layer 46, the source electrode 49, the drain electrode 50 and the like which is different from the region where the orientation of the liquid crystal is controlled.

To make a liquid crystal display in the above structure, a display and a non-display can be effected in such a manner that an electric field is applied to the molecules of the liquid crystal by applying a charge to a specific pixel electrode 15 by a specific thin film transistor 40 by imposing a signal to a necessary scan electrode wire G and signal electrode wire.

Figure 3:
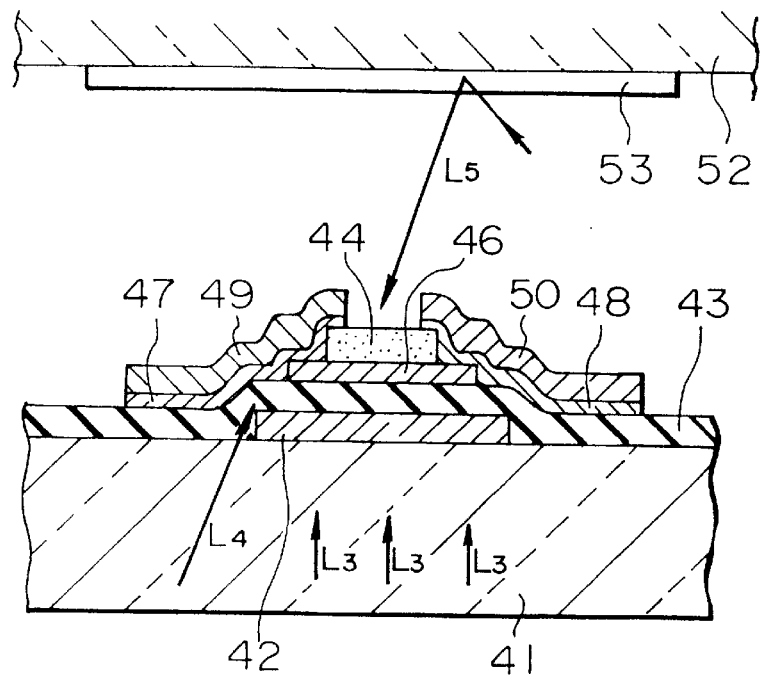
FIG. 3 is a cross sectional view showing an example in which the structure shown in FIG. 1 is applied to a liquid crystal display device.

Further, in the thin film transistor 40 having the above structure, since the gate electrode 42 is formed to the size for covering and concealing the semiconductor layer 46 from the substrate 41 side, even if lights linearly travel upward from the lower side of the substrate 41 as shown by the arrows $L_3$ in FIG. 3, since the lights are shielded by the light shielding gate electrode 42, they do not reach the semiconductor layer 46. Further, even if a light is obliquely incident from the peripheral portion of the gate electrode 42 as shown by the arrow $L_4$ in FIG. 3, since the light is shielded by the gate electrode 42, there is few possibility that the light shown by $L_4$ reaches the semiconductor layer 46.

Figure 8A:
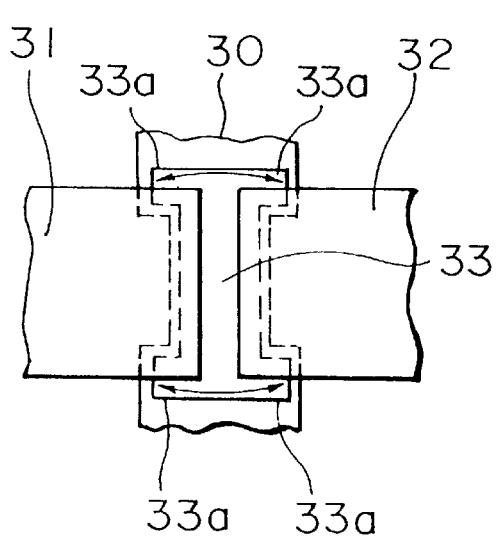
FIG. 8A is a plan view showing an example of a conventional thin film transistor proposed for the purpose of reducing the effect of a photoelectric current and FIG. 8B is a plan view showing a second example of the conventional thin film transistor proposed for the same object.
Figure 8B:
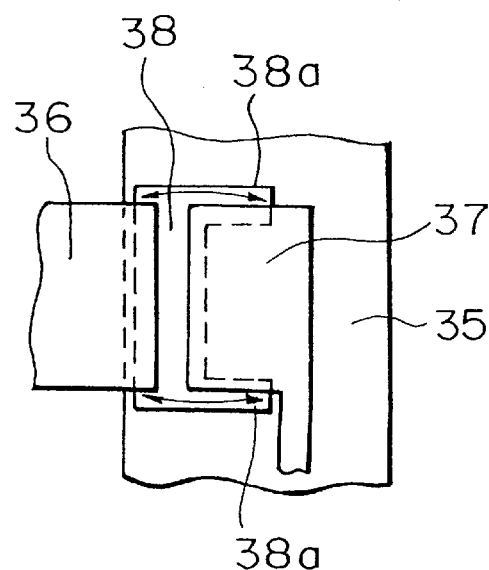

Next, there happens very rarely that a light is reflected from the black mask 53 on the confronting substrate 52 side as shown by the arrow $L_5$ in FIG. 3 and reaches the etching stopper layer 44 and a portion of the light reaches the semiconductor layer 46. In this case, there is a possibility in the conventional structures shown in FIG. 6 or FIG. 8 and FIG. 9 that a photoelectric current, although it is a small amount, flows through the side portions which are made by the semiconductor layer projecting in the line width direction of the source electrode and the line width direction of the drain electrode. In the structure of the embodiment of the present invention, however, since the width $d_1$ of the semiconductor layer 46 is smaller than the line width D of the source electrode and the drain electrode as shown in FIG. 2 and there is no side portion made by the projection of the semiconductor layer as found in the conventional structure, there is no photoelectric current flowing bus and no photoelectric current is made on the side portion. Therefore, even if a light is slightly incident on the semiconductor layer 46 from the confronting substrate 52 side, almost no photoelectric current flows and the off-current ($A_{off}$) of the thin film transistor is not increased accordingly. That is, when the thin film transistor 40 is driven, a ratio of on-current and off-current, that is, an on/off ratio is enhanced.

Figure 4:
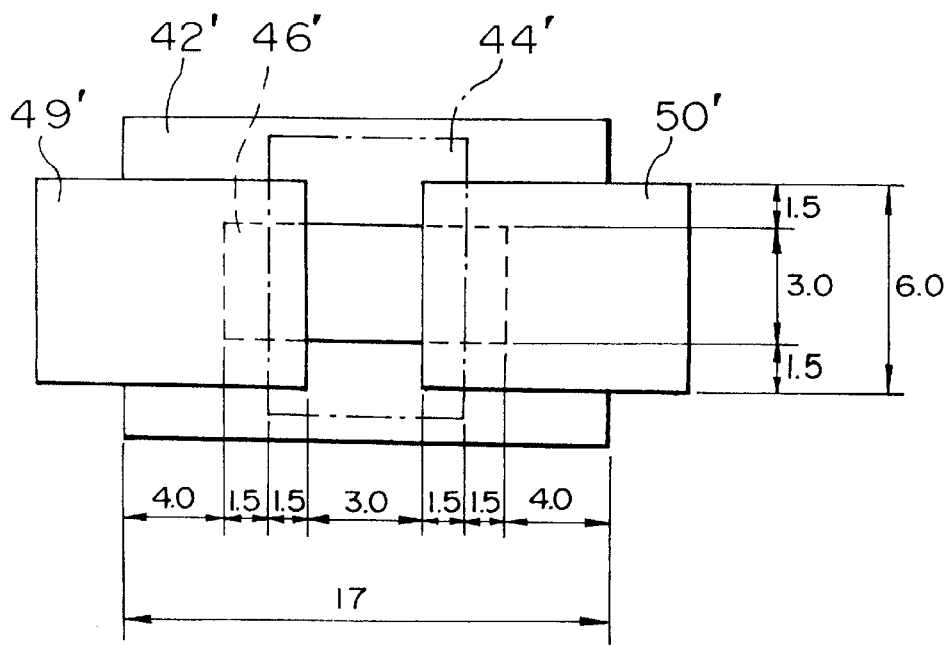
FIG. 4 is a view showing an example of dimensions when the structure according to the present invention is applied to the thin film transistor array substrate.

FIG. 4 shows an example of the dimension of the respective portions of the thin film transistor having the structure shown in FIG. 1 when it is embodied. As shown in FIG. 4, the structure according to the present invention can be realized to an actual thin film transistor array substrate by setting the lateral width of a gate electrode 42' to 17 μm, the line width of a right drain electrode 50' and a left source electrode 49'to 6 μm, the interval therebetween to 3.0 μm, the lateral width of the etching stopper layer 44' to 6 μm, the width of the source electrode 49' and the drain electrode 50' covering the etching stopper layer 44' to 1.5 μm, the lateral width of semiconductor layer 46' to 9 μm and the longitudinal width thereof to 3 μm.

What is claimed is:

1. A thin film transistor for liquid crystal display device comprising:
   a gate electrode formed on a transparent substrate;
   an insulation layer formed to cover an upper surface of the transparent substrate and the gate electrode;
   a semiconductor layer formed on the insulation layer disposed above the gate electrode and having a longitudinal width, a lateral width and a pair of edges, the gate electrode disposed to shade the semiconductor layer from light incident from a lower surface side of the transparent substrate;
   an etching stopper layer formed on the semiconductor layer; and
   a source electrode, a drain electrode and corresponding ohmic contact layers for the source electrode and the drain electrode, the source and drain electrodes and corresponding ohmic contact layers disposed over opposing sides of the semiconductor layer, the etching stopper layer, and the insulation layer, the source and drain electrodes connected with the semiconductor layer only through the corresponding ohmic contact layer;
   wherein an area of a projection of the semiconductor layer coplanar with a projection of an area of the gate electrode is contained within the projection of the area of the gate electrode,
   the longitudinal width of the semiconductor layer is smaller than longitudinal widths of the etching stopper layer and of the source and drain electrodes over the entire lateral width of the semiconductor layer,
   the etching stopper layer covers the entire semiconductor layer between the source and drain electrode, and
   the etching stopper layer and longitudinal widths of the source electrode and the drain electrode are sized to stop optical current from being generated in the semiconductor layer originating from light incident from an upper surface side of the transparent substrate.

2. A liquid crystal display device comprising a thin film transistor array substrate including the thin film transistor according to claim 1, a confronting substrate disposed to confront said thin film transistor array substrate, a liquid crystal sealed between said confronting substrate and said thin film transistor array substrate, a black mask disposed on a portion of said confronting substrate on a side nearest the thin film transistor array and a back light operative to transmit light through the transparent substrate such that said light is incident on said side of the confronting substrate nearest the thin film transistor array.

3. The thin film transistor for liquid crystal display device according to claim 1, wherein said gate electrode is aluminum.

4. The thin film transistor for liquid crystal display device according to claim 1, wherein said gate electrode is chromium.

5. The thin film transistor of claim 1, wherein the semiconductor layer has a substantially rectangular parallelpiped shape.

6. The thin film transistor of claim 1, wherein the longitudinal widths of the source and drain electrodes are at most twice the longitudinal width of the semiconductor layer disposed below the source and drain electrodes.

7. The thin film transistor of claim 1, wherein the longitudinal of the semiconductor layer remains substantially the same throughout the semiconductor layer.

8. A thin film transistor for liquid crystal display device comprising:
   a gate electrode formed on a transparent substrate;
   an insulation layer formed to cover an upper surface of the transparent substrate and the gate electrode;
   a semiconductor layer formed on the insulation layer disposed above the gate electrode and having a longitudinal width, a lateral width and a pair of edges, the gate electrode disposed to shade the semiconductor layer from light incident from a lower surface side of the transparent substrate;
   an etching stopper layer formed on the semiconductor layer; and
   a source electrode and a drain electrode disposed over opposing sides of the semiconductor layer, the etching stopper layer, and the insulation layer;
   wherein an area of a projection of the semiconductor layer coplanar with a projection of an area of the gate electrode is contained within the projection of the area of the gate electrode,
   the longitudinal width of the semiconductor layer is smaller than longitudinal widths of the etching stopper layer and of the source and drain electrodes over the entire lateral width of the semiconductor layer,
   the etching stopper layer covers the entire semiconductor layer between the source and drain electrode, and
   the etching stopper layer and longitudinal widths of the source electrode and the drain electrode are sized to stop optical current from being generated in the semiconductor layer originating from light incident from an upper surface side of the transparent substrate.

9. A liquid crystal display device comprising a thin film transistor array substrate including the thin film transistor according to claim 8, a confronting substrate disposed to confront said thin film transistor array substrate, a liquid crystal sealed between said confronting substrate and said thin film transistor array substrate, a black mask disposed on a portion of said confronting substrate on a side nearest the thin film transistor array and a back light operative to transmit light through the transparent substrate such that said light is incident on said side of the confronting substrate nearest the thin film transistor array.

10. The thin film transistor for liquid crystal display device according to claim 8, wherein said gate electrode is aluminum.

11. The thin film transistor for liquid crystal display device according to claim 8, wherein said gate electrode is chromium.

12. The thin film transistor of claim 8, wherein the semiconductor layer has a substantially rectangular parallelpiped shape.

13. The thin film transistor of claim 8, wherein the longitudinal widths of the source and drain electrodes are at most twice the longitudinal width of the semiconductor layer disposed below the source and drain electrodes.

14. The thin film transistor of claim 8, wherein the longitudinal of the semiconductor layer remains substantially the same throughout the semiconductor layer.

* * * * *